C. J. PETERSON.
MOTION PICTURE MACHINE.
APPLICATION FILED AUG. 13, 1918.
1,338,695.
Patented May 4, 1920.
2 SHEETS—SHEET 1.
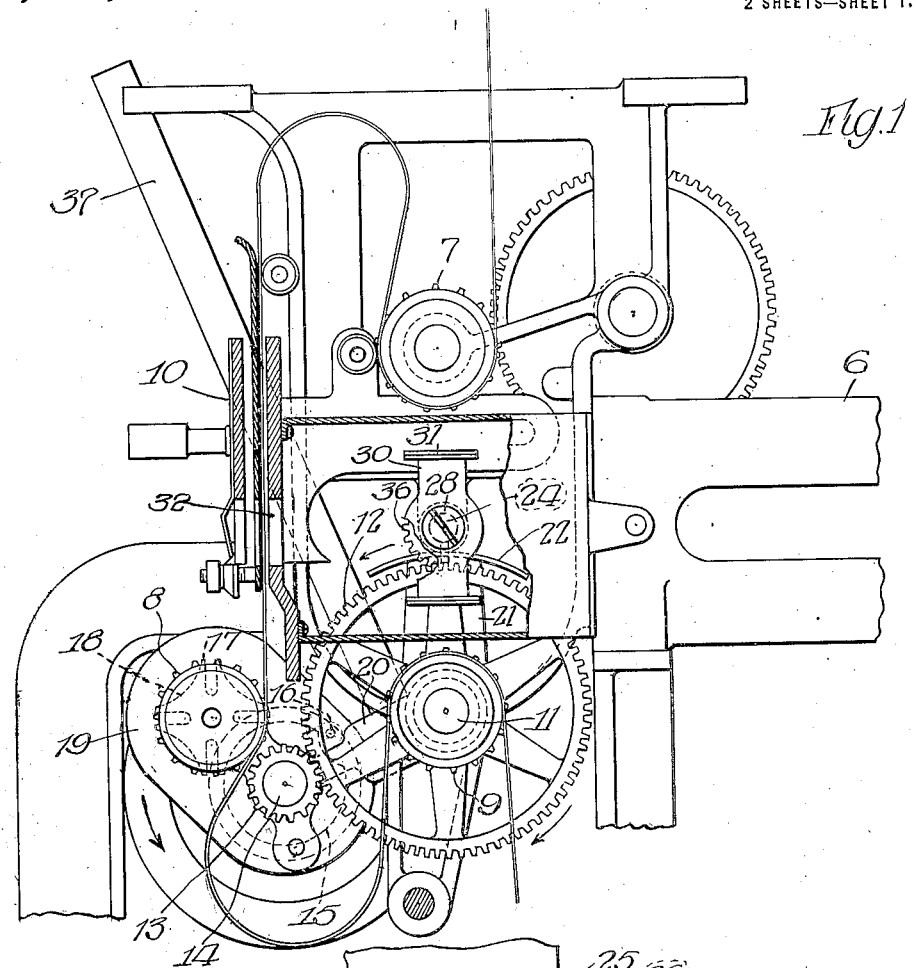
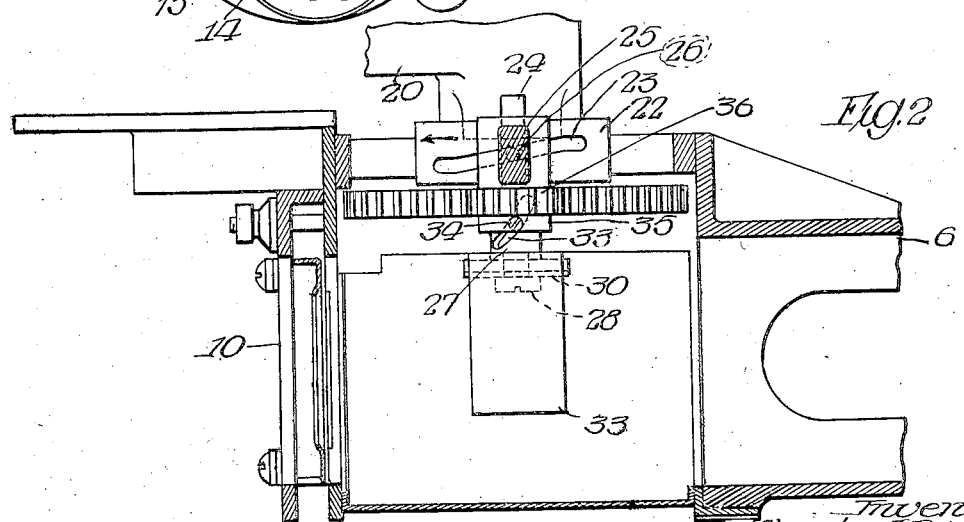

C. J. PETERSON.
MOTION PICTURE MACHINE.
APPLICATION FILED AUG. 13, 1918.
1,338,695.
Patented May 4, 1920.
2 SHEETS—SHEET 2.
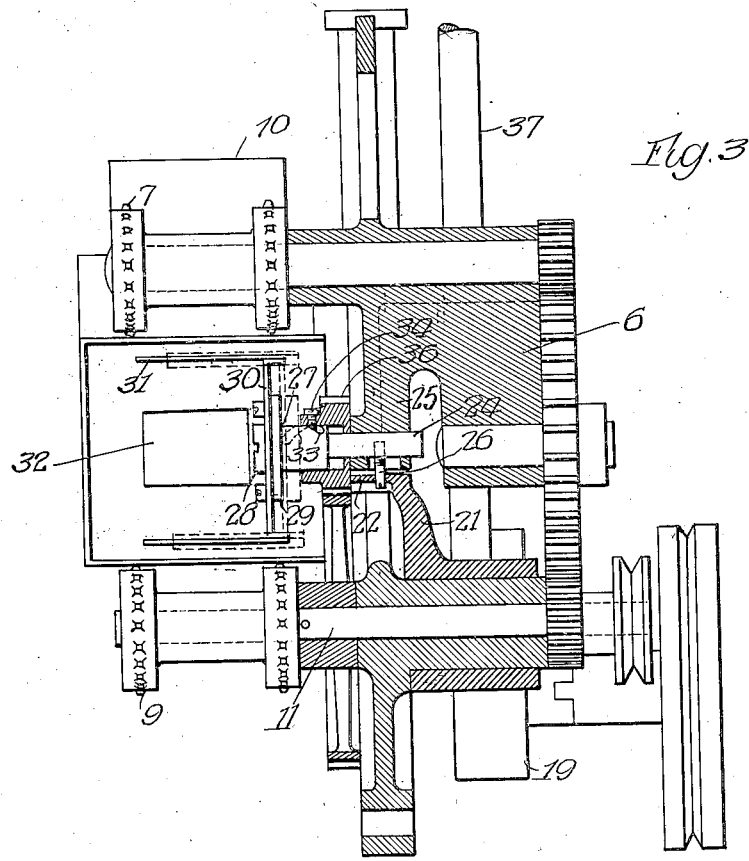
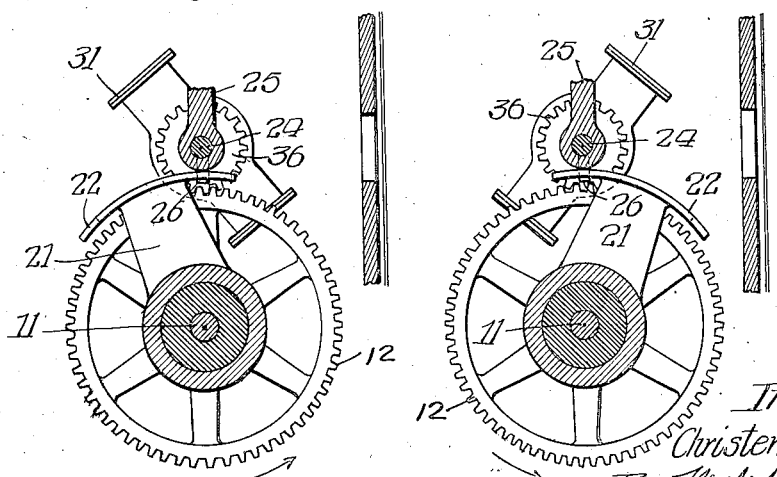
Inventor
Christen J. Peterson

UNITED STATES PATENT OFFICE.

CHRISTEN J. PETERSON, OF CHICAGO, ILLINOIS.

MOTION-PICTURE MACHINE.

1,338,695.   Specification of Letters Patent.   Patented May 4, 1920.

Application filed August 13, 1918. Serial No. 249,636.

*To all whom it may concern:*

Be it known that I, CHRISTEN J. PETERSON, a citizen of the United States, residing at Chicago, in the county of Cook and State of Illinois, have invented certain new and useful Improvements in Motion-Picture Machines, of which the following is a specification.

The present invention relates more particularly to certain mechanism in connection with motion picture machines having to do with the film framing operation and with maintaining the shutter and film feeding mechanism in proper timed relation during such framing operation.

The object of the invention is to provide a film feeding mechanism which can be moved for the purpose of bodily moving the film with respect to the light aperture and thus carry out the framing operation.

A further object of the invention is to provide a movable shutter which will be mounted upon a stationary shaft and to provide means for imparting to this shutter a movement causing an angular displacement thereof during the framing operation, so that it is maintained in proper timed relation with respect to the film feeding mechanism.

A further object of the invention is to provide a main driving gear for the film feeding mechanism and shutter and to turn the film feeding mechanism and the member for imparting angular displacement to the shutter about the center of this drive shaft, whereby said feeding mechanism and shutter are maintained in driving connection.

A further object of the invention is to carry out the angular displacement of the shutter by means of certain inclined slot and pin connections.

The invention further consists in the features of construction and combination of parts hereinafter described and claimed.

In the drawings:

Figure 1 is a side view of the head of a motion picture machine partially broken away and showing the present invention in operative position;

Fig. 2 is a plan view of the shutter and the mechanism associated therewith for giving it an angular displacement, together with a portion of the head;

Fig. 3 is a vertical section through the head of a motion picture machine, showing the shutter in one position by means of full lines and in an angularly displaced position by means of dotted lines;

Fig. 4 is a diagrammatic view, showing the position of the parts when an angular displacement of the shutter is made in one direction; and Fig. 5 is a view similar to Fig. 4, showing the position of the parts when a displacement of the shutter is made in the opposite direction.

Referring now to the drawings, the invention is disclosed in conjunction with a head 6 of a motion picture machine. The head carries a film feeding sprocket 7, an intermittent film actuating sprocket 8, a film take-up sprocket 9 and a film gate 10, all as is usual in motion picture machine constructions; and these parts, as well as the head, may be of any suitable style and arrangement desired.

A shaft 11 is provided, which is driven by any suitable means. Mounted upon this shaft is a main driving gear 12. Meshing with this driving gear is a pinion 13 mounted on a shaft 14; and carried by this shaft is a disk 15 having thereon a pin 16. As this disk revolves, the pin 16 engages in certain slots 17 in a star-wheel 18, producing an intermittent movement to the film actuating sprocket 8. The said pin and star-wheel movement is very common in motion picture machines and is known as the Geneva movement, and actuates the film with the usual intermittent movement to give the alternate periods of rest and movement thereto.

The pin and star-wheel are carried within a casing 19, from which extends an arm or web 20 having a turning fit on the shaft 11. Also joined to the arm 20 is an arm 21 carrying a plate 22 at its upper end, which plate is formed with a diagonal slot 23. Positioned directly above this plate is a shaft 24 held in a suitable bearing 25, so that it has no movement except a longitudinal sliding one, as will be hereinafter explained; and extending from this shaft 24 is a pin 26 engaging with the slot 23 in the plate 22.

The shaft has loosely mounted thereon a sleeve 27 and the shaft terminates in a head 28. The sleeve 27 is provided with a flange 29 secured to a cross or tie plate 30, connecting together shutter blades 31. These shutter blades pass across the light opening 32 for the purpose of cutting off the light as the film moves down, and letting through the light when the film is at rest in the usual and well known manner. The sleeve 27 is formed with a diagonal slot 33, and entering said slot is a pin 34 carried by a hub 35 extending from a pinion 36, which is in mesh with the gear 12.

In normal operation of the device, as the shaft 11 is rotated, it turns the gear 12, which rotates the pinion 13 and imparts movement to the pin and star-wheel mechanism to intermittently operate the film actuating sprocket 8 and intermittently feed the film. Rotation of the gear 12 also imparts a rotative movement to the pinion 36, which turns the hub 35, and through the pin and slot connection turns the sleeve 27, imparting movement to the flange 29 and to the shutter, so that the blades are rotated about the center of the shaft 24 to cut off and let on the light in the usual manner.

The rotation of the pinion 36 would tend to advance the pin 34 in the slot 33 and would force the shutter outwardly along the said shaft, except for the fact that the cross wall 30 of the shutter engages the head 28 of the shaft 24; and the sleeve and shutter are thus held against such outward movement and are given a rotary motion by the pinion 36, so that under normal conditions the film actuating mechanism and the shutter are operated in the usual manner and in proper timed relation, whereby the shutter cuts off the light during the periods when the film actuating mechanism moves the film past the light aperture, and the shutter permits the light to pass through the light aperture and through the film during the periods when the film is at rest.

Assume that for some reason or other the picture gets out of alinement with the light aperture, so that a part of one picture and a part of another are exposed at the same time: It becomes necessary then to bodily move the film to correct the position thereof with respect to the light aperture. To accomplish this, the operator moves a handle or rod 37, which rocks the arms 20 and 21 about the center of the shaft 11 and bodily moves the casing 19.

Assume that this movement of the casing 19 is in a downward direction about the center of the shaft 11, as indicated by the arrow in Fig. 1: This will cause the pinion 13 to ride over the periphery of the gear 12 and will impart to said pinion an abnormal backward movement in the direction of the arrow in Fig. 1. This turns the shaft 14 and the pin 16 carried by the disk 15 mounted on the shaft in the direction of the arrow in Fig. 1 and toward the star-wheel 18. This downward movement of the casing 19 will move the film actuating sprocket 8 in a similar direction, imparting a downward pull upon the film and thus centering it with respect to the light aperture.

But when normal movement of the machine is resumed, it will be apparent that, owing to the advance of the pin 16 toward the star-wheel 18, the said pin will engage with a slot of the star-wheel upon its next movement sooner than it otherwise would, and accordingly there will be an abnormal quick action of the star-wheel upon its next movement, and a corresponding abnormal quick movement of the sprocket 8 and the film. This abnormal action will only be for this one movement, and after that the star-wheel will operate in the usual manner.

If the shutter remained in the same position, it is obvious that the abnormal movement imparted to the star-wheel would throw the movement of the film out of time with the movement of the shutter. That is, the sprocket 8 would move to pull the film down before the shutter had gotten into position to cut off the light, and this would produce a flickering.

There is thus the necessity of imparting to the shutter an angular displacement to allow it to accommodate itself to the abnormal movement of the star-wheel. This is produced by moving the plate 22 in accordance with the movement of the casing 19, and this is brought about by the arm 21, which is connected to the arm 20 of said casing.

With the movement of the casing in the direction of the arrow of Fig. 1, the plate 22 will be moved in the direction of the arrow in said figure by the swing of the arm 21. Such movement of the plate is indicated by the arrow in Fig. 2, and, as will be understood from said figure, the slot 23 would be moved so that it would act on the pin 26 to move the shaft 24 into the dotted line position of Fig. 3, carrying the head 28 on the end of this shaft into such dotted line position. Upon a continued rotation of the pinion 36, the sleeve 27 will be turned by reason of the pin 34 engaging with the walls of the slot 33.

The turning of the sleeve 27 would turn the shutter, owing to the connection of the flange 29 thereto, and would move the shutter blades in the direction of the arrow in Fig. 2, or into the position shown in Fig. 4, wherein it will be seen that the shutter has advanced abnormally and toward the light aperture, and will be in a position to cross the aperture and cut off the light sooner than it normally would.

It will be remembered that the film will be given an abnormally quick movement by the film actuating sprocket, and hence the shutter is angularly displaced so as to act abnormally quick on its next movement, and thus accommodate itself to the abnormal movement of the film. In this manner, the film actuating mechanism and shutter are maintained in proper synchrony to cause the shutter to cut off the light as the film is moving.

Should the framing operation be produced by moving the casing and the film actuating sprocket 8 in the opposite direction from the arrow of Fig. 1, directly the opposite effect will be produced on the action of the star-wheel. That is, the pinion 13 will ride over the gear 12 and be turned in a counter direction from the arrow of Fig. 1, moving the pin away from the star-wheel and producing an abnormal retarded movement to the film. The plate 22 will under such conditions be moved in the opposite direction from the arrow of Fig. 1, which will push the shaft 24 out or to the left, as shown in Fig. 3, and the shutter will be moved to the left, as shown in full lines in Fig. 3.

The inward movement of the shaft 24 will move the sleeve 27 inward, and by reason of the slot 33 and pin 34, said sleeve will be rotated in the reverse direction from what it would be rotated in the first described framing operation, and the shutter be placed into the position of Fig. 5, wherein it is moved away from the light aperture and will cross the aperture later than normal. This produces an abnormal retarded movement to the shutter, which is in accordance with the retarding movement to the feed of the film. In this manner, whichever way the film is moved to produce the framing operation, the shutter and film feeding mechanism maintain their synchrony.

It is understood that the abnormal movement of the film feeding mechanism and the abnormal movement of the shutter occur for only the first movement of these parts after the framing operation, and that after this first movement the parts move with the usual timing to their movements.

I claim:

1. In a motion picture machine, the combination of film actuating mechanism, a shutter member, means for operating the shutter, means for driving said actuating mechanism and shutter operating means, means for moving said actuating mechanism to frame the picture, a mounting for the shutter upon which it revolves, means comprising a pin and diagonal slot for moving said mounting longitudinally when the film mechanism is moved to frame the picture, and means actuated by the movement of said mounting to slide and turn the shutter on its mounting, whereby angular displacement of the shutter is effected and it is maintained in proper timed relation to the film actuating mechanism, substantially as described.

2. In a motion picture machine, the combination of film actuating mechanism, a shutter member, means for operating said mechanism and member, a mounting upon which the shutter revolves, means for moving the film actuating mechanism to frame the picture, means for imparting a longitudinal sliding movement to the mounting when said actuating mechanism is moved to frame the picture, and means comprising a pin and diagonal slot for sliding and turning the shutter with respect to the mounting when the mounting is moved to angularly displace the shutter and maintain the shutter and film actuating mechanism in proper timed relation, substantially as described.

3. In a motion picture machine, the combination of film actuating mechanism, a shutter member, means for driving said mechanism and shutter, means for moving the film actuating mechanism to frame the picture, a mounting on which the shutter revolves, a pin and diagonal slot mechanism for imparting a longitudinal sliding movement to the mounting when the film actuating mechanism is moved to frame the picture, a pin and slot mechanism operating when the mounting is moved to slide and turn the shutter with respect to the mounting to angularly displace the shutter and maintain it and the film actuating mechanism in proper timed relation, substantially as described.

4. In a motion picture machine, the combination of film actuating mechanism, a shutter member, a main driving gear, a driving pinion for said shutter operated by said gear, a driving pinion for the film actuating mechanism operated by said gear, a mounting on which the shutter revolves, a bell crank arm loosely mounted on the main driving shaft and attached at one end to the film actuating mechanism, a plate carried on the other end of the bell crank arm and having a diagonal slot therein, a pin extending from the shutter mounting and entering said slot, said arm being moved when the film actuating mechanism is moved to frame the picture, whereby said pin and slot coöperate to give a sliding movement to the shutter mounting, and means operating when the mounting is moved to slide and turn the shutter with respect to the mounting to give an angular displacement to the shutter, whereby said shutter and film actuating mechanism are maintained in proper timed relation, substantially as described.

5. In a motion picture machine, the combination of film actuating mechanism, a shutter member, a main driving gear, a driving pinion for said shutter operated by said gear, a driving pinion for the film actuating mechanism operated by said gear, a mounting on which the shutter revolves, a bell crank arm loosely mounted on the main driving shaft and attached at one end to the film actuating mechanism, a plate carried on the other end of the bell crank arm and having a diagonal slot therein, a pin extending from the shutter mounting and entering said slot, said arm being moved when the film actuating mechanism is moved to frame the picture, whereby said pin and slot coöperate to give a sliding movement to the shutter mounting, and means comprising a pin and diagonal slot acting when the mounting is moved to slide and turn the shutter with respect to the mounting to impart an angular displacement to the shutter, whereby said shutter and film actuating mechanism are maintained in proper timed relation, substantially as described.

6. In a motion picture machine, the combination of film actuating mechanism, a shutter member, means for operating the shutter, means for driving said actuating mechanism and shutter operating means, means for moving the film actuating mechanism to frame the picture, a mounting for the shutter on which it revolves, means attached to and moved with the film actuating mechanism for shifting the shutter mounting, and means operating when said mounting is shifted to turn and slide the shutter along the mounting and impart to the shutter an angular adjusting movement, whereby the film actuating mechanism and shutter are maintained in proper timed relation, substantially as described.

7. In a motion picture machine, the combination of film actuating mechanism, a shutter member, a main driving gear, a driving pinion for said shutter operated by said gear, a driving pinion for the film actuating mechanism operated by said gear, a mounting on which the shutter revolves, a bell crank arm loosely mounted on the main driving shaft and attached at one end to the film actuating mechanism, a member carried on the other end of the bell crank arm and moving therewith, said member coöperating with means upon the shutter mounting to slide the mounting when the bell crank arm is moved, and means acting to slide and turn the shutter upon the mounting when the latter is moved, whereby said shutter is given an angular displacement and maintained in proper timed relation to the film actuating mechanism, substantially as described.

CHRISTEN J. PETERSON.